United States Patent [19]

Casey et al.

[11] 3,912,692

[45] Oct. 14, 1975

[54] PROCESS FOR POLYMERIZING A SUBSTANTIALLY PURE GLYCOLIDE COMPOSITION

[75] Inventors: Donald James Casey, Ridgefield; Martin Epstein, Norwalk, both of Conn.

[73] Assignee: American Cyanamid Company, Stamford, Conn.

[22] Filed: Sept. 24, 1974

[21] Appl. No.: 508,778

Related U.S. Application Data

[63] Continuation-in-part of Ser. No. 356,977, May 3, 1973, abandoned.

[52] U.S. Cl. .................. 260/78.3 R; 260/468 R
[51] Int. Cl.² ........................................ C08G 63/08
[58] Field of Search .................. 260/78.3 R, 468 R

[56] References Cited
UNITED STATES PATENTS

| | | | |
|---|---|---|---|
| 3,169,945 | 2/1965 | Hostettler et al. | 260/78.3 |
| 3,442,871 | 5/1969 | Schmitt et al. | 260/78.3 |
| 3,457,280 | 7/1969 | Schmitt et al. | 260/340.2 |
| 3,468,853 | 9/1969 | Schmitt et al. | 260/78.3 |

OTHER PUBLICATIONS

Noller, "Chemistry of Organic Compounds," 2nd Ed., Saunders, 1957, pp. 412–413.

Primary Examiner—Melvin Goldstein
Assistant Examiner—E. A. Nielsen
Attorney, Agent, or Firm—James T. Dunn

[57] ABSTRACT

A process for polymerizing a glycolide composition comprising heating a mixture of a substantially pure glycolide with certain small quantities of inositol and the polymeric material thus produced.

7 Claims, No Drawings

PROCESS FOR POLYMERIZING A SUBSTANTIALLY PURE GLYCOLIDE COMPOSITION

CROSS REFERENCE TO RELATED APPLICATION

This application is a continuation-in-part of our earlier application Ser. No. 356,977 filed May 3, 1973, now abandoned.

BACKGROUND OF THE INVENTION

When glycolic acid or its cyclic dimer glycolide is polymerized, the resultant polymer can be produced in shaped form such as filaments or films including self-supporting films which can be sterilized and utilized as a suture material particularly in braided form or used as other prosthetic devices for surgical purposes. When used as filaments in a braided suture, the suture material should have good straight pull strength and good knot strength before use in order that a surgeon in using such a suture material may be able to close a wound effectively with a suture material having good tensile strength. It is further important that the suture material thus produced have good straight pull strength retention for a sufficient period of time after implantation in living tissue such as retaining straight pull strength for a period of about 15 days or more so as to enable the wound to heal. Low molecular weight materials are not generally useful in the suture field because they usually lack sufficient tensile strength. It is therefore desirable as a rule to produce a polymeric material that has a very high molecular weight in order to impart thereto the tensile strength required for the ultimate use of the filaments.

1. Field of the Invention

The present invention is in the field of polymerizing a substantially pure glycolide composition in the presence of small quantities of inositol and a polymerization catalyst in order to produce a substantially high molecular weight polymeric composition. The polymers produced can be converted to shaped form such as filaments, films and other surgically useful solid prostheses such as reinforcing pins, screws, plates or cylinders. On implantation, in living mammalian tissue, these polyglycolic acid materials are absorbed and replaced by living tissue.

2. Description of the Prior Art

The most pertinent prior art presently known by the instant applicants are the U.S. Pat. Nos. 3,442,871 and 3,468,853. Each of these patents are incorporated herein by reference.

SUMMARY OF THE INVENTION

This invention relates to a process for polymerizing a glycolide comprising heating a mixture of a substantially pure glycolide composition, from about 0.01 to 0.15 mole percent based on the moles of said glycolide composition of inositol and from about 0.0001 to about 0.010 mole percent based on the moles of said glycolide composition of a polymerization catalyst at a temperature between about 210°C. and 245°C. for a period of time varying inversely between about 120 minutes and 20 minutes.

Still further, this invention relates to a process for polymerizing the aforementioned substantially pure glycolide composition in admixture with the stated quantities of inositol in the presence of a polymerization catalyst under the conditions indicated in order to produce a polymeric melt which is extrudable in a filamentary form so as to provide a material for use as a sterile synthetic absorbable suture.

One of the objects in the present invention is to provide a process for polymerizing a substantially pure glycolide composition in the presence of an initiator or accelerator namely a small quantity of inositol so as to provide the polymeric material with controlled high molecular weight. A further object of the present invention is to provide a substantially pure polyglycolide composition by the process of the present invention in which a melt is produced which can be readily converted by spinning through one or more orifices of a spinnerette so as to provide a filamentary material particularly useful as a synthetic absorbable suture material. These and other objects of the present invention will be discussed in greater detail herein below.

The glycolide composition used in the present invention is a substantially pure composition that consists essentially of $\alpha$-glycolide and/or $\beta$-glycolide. The $\alpha$-glycolide and its method of preparation are fully described in the U.S. Pat. No. 3,457,280. The $\beta$-glycolide and its method of preparation are disclosed in the U.S. Pat. No. 3,435,008. The method for purifying the glycolide is disclosed in the U.S. Pat. No. 3,597,450. Each of these patents are incorporated herein by reference.

The amount of the inositol used in the preparation of the polymeric material of the present invention may be varied from about 0.01 mole percent to about 0.15 mole percent based on the moles of said glycolide composition used in the process. It is preferred to use between about 0.02 mole percent and 0.10 mole percent of the inositol based on the moles of the glycolide composition used in the process. The product produced by the process is a polyglycolide composition containing a reacted content or a chemically combined content of inositol of from about 0.01 mole percent to about 0.15 mole percent, based on the total weight of pure glycolide composition used in the preparation of the polyglycolide composition.

In practicing the process of the present invention one may use many of the polymerization catalysts that are known to be useful for the polymerization of glycolic acid or glycolide composition such as those disclosed in the U.S. Pat. No. 2,676,945 namely antimony trioxide and dibutyl tin dilaurate, or the antimony trifluoride as disclosed in the U.S. Pat. No. 2,585,427. It is preferred to use the stannous chloride dihydrate which is disclosed in the two patents listed under the known prior art hereinabove. Additionally one can use stannous stearate, tributyl stannic methoxide or dibutyl stannic oxide and the like. The amount of catalytic material used in the practice of the process of the present invention may be varied between about 0.0001 mole percent and 0.010 mole percent based on the total number of moles of purified glycolide composition used. It is preferred to use between about 0.001 mole percent and 0.005 mole percent of the catalyst based on the number of moles of the purified glycolide composition used.

The U.S. pat. No. 2,668,162 shows the polymerization of hydroxy acetic acid with the formation of a large proportion of glycolide and indicates that one may advantagously prepare copolymers of glycolide with small quantities, e.g. up to 15% of other lactides such as lactide and disalicylide. The U.S. Pat. No.

2,683,136 also discloses the preparation of copolymers of hydroxyacetic acid with other monohydroxy monocarboxylic alcohol acids of 2 to 11 carbon atoms in which the hydroxyacetic acid predominates. Each of these patents are incorporated herein by reference.

In order that the concept of the present invention may be more fully understood the following examples are set forth in which all parts are parts by weight unless otherwise specified. These examples are set forth primarily for the purpose of illustration and any specific enumeration of detail contained therein should not be interpreted as a limitation on the case except as indicated in the appended claims.

EXAMPLE 1

Into a suitable reaction vessel, there is introduced 20 parts of a purified glycolide composition, 0.012 part of inositol (0.039 mole %), and 0.40 part by volume of a 0.10% solution of $SnCl_2 \cdot 2H_2O$ in diethylether. The ether is removed from the system under reduced pressure, the vessel is sealed and the contents are heated at 222°C. for 60 minutes after which the vessel is opened and the polymer is removed and ground to <20 mesh. The ground polymer is then extracted with acetone to remove 6.3% of unreacted glycolide monomer. The resulting polymer had an inherent viscosity of 1.50 when measured on a 0.5% solution in hexafluoroacetone sesquihydrate at 30°C.

COMPARATIVE EXAMPLE 2

Example 1 is repeated in all essential details except that in the place of the inositol there is used the same molar amount of lauryl alcohol (0.039 mole %). The inherent viscosity, measured under exactly the same conditions, was 0.92.

COMPARATIVE EXAMPLE 3

Example 1 is repeated in all essential details except that the inositol is replaced by lauryl alcohol but the amount of lauryl alcohol is doubled (0.077 mole %). The inherent viscosity, measured again under the same conditions, was 0.93.

COMPARATIVE EXAMPLE 4

Example 1 was repeated again in all essential details except that the inositol was replaced by lauryl alcohol and the amount of lauryl alcohol was 4 times the mole percent used in Example 1 (0.154 mole %). The inherent viscosity measured under the same conditions was 0.76.

COMPARATIVE EXAMPLE 5

Example 1 is repeated in all essential details except that the inositol is replaced with lauryl alcohol and the amount of lauryl alcohol was eight times the mole percent of the inositol used in Example 1 (0.308 mole %). The inherent viscosity of the resulting polymer was 0.69.

These lower inherent viscosities reflect a lower molecular weight of the polymer produced.

EXAMPLE 6

Into a suitable reaction vessel, there is introduced 20 parts of a purified glycolide composition, 0.006 part of inositol (0.019 mole %) and 0.40 part by volume of a 0.1% solution of stannous chloride dihydrate in diethylether. The ether is removed from the system under reduced pressure and the vessel is then sealed and the contents are heated at 222°C. for 60 minutes. The vessel is opened and the polymer is removed and ground to <20 mesh and extracted with acetone to remove 12.7% of unreacted glycolide monomer. The resulting polymer had an inherent viscosity of 1.49 when measured on a 0.5 % solution in hexafluoroacetone sesquihydrate at 30°C.

EXAMPLE 7

Into a suitable reaction vessel, there is introduced 25 parts of a purified glycolide composition, 0.0037 part of inositol (0.010 mole %) and 0.50 part by volume of a 0.1% solution of stannous chloride dihydrate in diethylether. The ether is then removed from the system under reduced pressure and the vessel is sealed and the contents are heated at 222°C. for 65 minutes. The vessel is then opened and the polymer is removed and ground to <20 mesh and extracted with acetone to remove 15.9% of unreacted glycolide monomer. The resulting polymer had an inherent viscosity of 1.22 when measured on a 0.5% solution hexafluroracetone sesquihydrate at 30°C.

EXAMPLE 8

Example 7 is repeated in all essential details except the amount of inositol used was 0.020 part amounting to 0.051 mole percent. After removal of a small amount of monomer the inherent viscosity was 1.31 when measured on a 0.5% solution in hexafluoroacetone sesquihydrate at 30°C.

EXAMPLE 9

Into a suitable reaction vessel, there is introduced 20 parts of a purified glycolide composition, 0.024 part of inositol (0.077 mole %) and 0.4 part by volume of a 0.1% solution of stannous chloride dihydrate in diethylether. The ether is then removed from the system under reduced pressure as in Example 1 and the vessel is then sealed and the contents are heated at 222°C. for 60 minutes. The vessel is opened and the polymer is removed and ground as before and extracted with acetone to remove about 2.2% of unreacted glycolide monomer. The resulting polymer had an inherent viscosity of 1.22 when measured on a 0.5% solution in hexafluoroacetone sesquihydrate at 30°C.

EXAMPLE 10

Into a suitable reaction vessel, there is introduced 20 parts of a purified glycolide composition, 0.012 part of inositol (0.039 mole %) and 0.4 part by volume of a 0.1% solution of stannous chloride dihydrate in diethylether. The ether is removed as before and the vessel is then sealed and the contents are heated at 222°C. for 80 minutes. The vessel is opened as before and the polymer is removed and ground and extracted with acetone to remove 1.5% of unreacted glycolide monomer. The resulting polymer had an inherent viscosity of 1.37 when measured on a 0.5% solution of hexafluoroacetone sesquihydrate at 30°C.

Inositol is the generic name of 9 stereoisomeric cyclohexane hexols. The internationally accepted name for inositol is 1,2,3,4,5,6-cyclohexanehexol. It is theorized that the inositol, because of the substantial number of alcoholic hydroxy groups that it contains, tends to give branched polymers when used to modify the polyglycolide composition. On the other hand it is theorized that the monohydric and dihydric alcohols when used to modify the polymeric glycolide material give preponderantly linear polymers only.

The linear polyglycolide compositions prepared with lauryl alcohol as in Examples 2-5 inclusive hereinabove were used as a basis to establish a relationship between the inherent viscosity measured as described in the examples and the weight average molecular weight determined by light scattering. For instance a linear polyglycolide having an inherent viscosity of 0.7 would have a weight average molecular weight of about 31,000. Other components of the inherent viscosities with the weight average molecular weights are set forth herein below.

| Inherent Viscosities | Weight Average Molecular Weights |
|---|---|
| 0.8 | 38,500 |
| 0.9 | 47,000 |
| 1.0 | 56,000 |
| 1.2 | 76,000 |
| 1.4 | 100,000 |
| 1.6 | 128,000 |

It is hypothesized that the polymers prepared according to the process of the present invention are branched polymers which would be expected to have even higher molecular weights for a given measured inherent viscosity. The Examples 1 and 6-10 inclusive, set forth hereinabove, illustrate clearly the ease with which glycolide polymers can be prepared in very high molecular weights by the use of inositol as a chain initiator or molecular weight regulator. The monofunctional alcohols such as lauryl alcohol produce polyglycolides that are unquestionably high enough in molecular weight to afford strong, usable products including absorbable sutures, but polymerization of the substantially pure glycolide in the presence of the inositol opens up a new and still higher range of polymeric molecular weight plus an increase in the resulting tensile properties of the fabricated objects including straight pull tensile strength and knot pull tensile strength.

It is apparent from these examples that there is an optimum concentration range of inositol to be used in the polymerization of glycolide in order to obtain quickly and easily the desired very high molecular weight polymers. The use of greater amounts of the inositol leads to a decrease in the molecular weight of the polymer while the use of lower concentrations of inositol slows the rate of polymer formation. A reaction time between 30 minutes and 60 minutes at 220°C. leads to a high molecular weight product while a polymerization prolonged beyond 90 minutes at 220°C. results in a steady decrease in the polymer molecular weight. At temperatures as high as 245°C. the acceptable reaction time is accordingly shortened, while at temperatures as low as 210°C. the reaction time can be extended for up to 120 minutes without an excessive penalty in molecular weight loss so long as solidification of the polymer melt is avoided. It should also be noted that the selection of the polymerization temperature is equally important. Polymerization at temperatures too far above 245° C. results in the production of polymers having molecular weights that are lower than the optimum, while in polymerizations conducted at temperatures significantly below 210°C. the polymerizing mass is sufficiently far below the crystalline melting point of the polymer to risk the sudden uncontrolled onset of these critical items also presents a danger of damage to the polymerization equipment.

Since glycolide is sensitive to moisture it is greatly to be desired that the substantially pure glycolide composition be kept in as dry a state as possible after purification and prior to the initiation of the polymerization reaction.

It has been indicated hereinabove that copolymers of glycolides with other monohydroxy monocarboxylic acids can be prepared according to the U.S. Pat. No. 2,668,162 and the U.S. Pat. No. 2,683,136. Preparation of these copolymers can also be carried out with the inositol and the amount of the inositol which will be used in the preparation of these copolymers will be the same as the amount of the inositol used in the polymerization of the glycolide composition alone. For instance, if one were to make a copolymer of glycolide and lactide using inositol, one would use between about 0.01 to about 0.15 mole percent, based on the total moles of the glycolide and the lactide, of inositol. By the same token, the amount of the catalytic material used would be the same and the polymerization conditions would be the same for the preparation of the copolymer of the glycolide and the lactide as was used in the polymerization of the glycolide composition itself. In order to illustrate the process for preparing these copolymers, polymers were prepared with 100% glycolide as well as with mixtures containing 90% glycolide and 10% lactide or 85% glycolide and 15% lactide in the presence of certain mole percents of inositol or lauryl alcohol. The procedure in each of these examples is substantially identical to the procedure carried out in Example 1 set forth hereinabove. The results of these additional experiments are set forth in the Table hereinbelow. The specific lactide used in the l-lactide.

Table I

Inositol Initiated Glycolide/Lactide Copolymers

| Monomers Charged (Wt. %) | | MW Regulator | | | Conv., % | $\eta$inh[1] | % Lactide Units[2] |
|---|---|---|---|---|---|---|---|
| Glycolide | Lactide | Alcohol | Mole % | Wt. % | | | |
| 90 | 10 | Inositol | 0.039 | 0.06 | 94 | 1.37 | 6.2 |
| 90 | 10 | Lauryl | 0.075 | 0.12 | 90 | 1.04 | 5.5 |
| 85 | 15 | Inositol | 0.039 | 0.06 | 92 | 1.38 | 9.3 |
| 85 | 15 | Lauryl | 0.075 | 0.12 | 85 | 1.07 | 8.1 |
| 100 | 0 | Inositol | 0.039 | 0.06 | 98 | 1.41 | — |
| 100 | 0 | Lauryl | 0.075 | 0.12 | 92 | 1.17 | — |

[1] $\eta$inh measured on 0.5% solution in hexafluoroacetone sesquihydrate on monomer-free polymer
[2] Determined by NMR on monomer-free polymer

We claim:

1. A process for polymerizing a glycolide comprising heating a mixture of a substantially pure glycolide composition, from about 0.01 to 0.15 mole percent based on the moles of said glycolide composition of inositol and from about 0.0001 mole percent to about 0.010 mole percent, based on the moles of said glycolide composition of a polymerization catalyst at a temperature between about 210°C. and 245°C. for a period of time varying inversely between about 120 minutes and 20 minutes.

2. The process according to claim 1 in which the polymerization catalyst is $SnCl_2 \cdot 2H_2O$.

3. The process according to claim 2 in which the amount of inositol is between about 0.02 and 0.10 mole percent, based on the moles of the glycolide composition and the amount of the $SnCl_2 \cdot 2H_2O$ is between about 0.001 and 0.005 mole percent.

4. The process according to claim 1 in which the temperature is between about 220°C. and 230°C. for a period of time varying inversely between about 90 minutes and 30 minutes.

5. A polyglycolide composition containing a reacted content of about 0.01 to 0.15 mole percent, based on the total weight of pure glycolide used in the preparation of the polyglycolide composition, of inositol.

6. The process according to claim 1 in which up to about 15 weight percent of a lactide is copolymerized with the glycolide composition based on the combined weight of said glycolide and said lactide, the mole percent of the inositol and the mole percent of the polymerization catalyst is based on the total moles of said glycolide and said lactide.

7. A glycolide composition according to claim 5 in which there is present a copolymerized content of up to about 15 weight percent of a lactide and not more than about 85 weight percent of the glycolide composition based on the combined weight of the glycolide and lactide and the mole percent of inositol is based on the total moles of said glycolide and said lactide.

* * * * *

UNITED STATES PATENT OFFICE
CERTIFICATE OF CORRECTION

Patent No. 3,912,692　　　　　　　　　　Dated　　October 14, 1975

Inventor(s)　DONALD JAMES CASEY and MARTIN EPSTEIN

It is certified that error appears in the above-identified patent and that said Letters Patent are hereby corrected as shown below:

In Claim 7, line 3, cancel the word "more" and substitute in the place therefor the following -- less -- .

Signed and Sealed this thirteenth Day of April 1976

[SEAL]

Attest:

RUTH C. MASON  
Attesting Officer

C. MARSHALL DANN  
Commissioner of Patents and Trademarks